(12) United States Patent
Nath

(10) Patent No.: US 7,730,543 B1
(45) Date of Patent: Jun. 1, 2010

(54) METHOD AND SYSTEM FOR ENABLING USERS OF A GROUP SHARED ACROSS MULTIPLE FILE SECURITY SYSTEMS TO ACCESS SECURED FILES

(76) Inventor: Satyajit Nath, 7710 Huntridge La., Cupertino, CA (US) 95014

( * ) Notice: Subject to any disclaimer, the term of this patent is extended or adjusted under 35 U.S.C. 154(b) by 1622 days.

(21) Appl. No.: 10/610,832

(22) Filed: Jun. 30, 2003

(51) Int. Cl.
G06F 7/04 (2006.01)
G06F 17/30 (2006.01)
H04N 7/16 (2006.01)

(52) U.S. Cl. .......................... 726/27; 713/171; 726/14
(58) Field of Classification Search ................. 713/171; 726/14, 27
See application file for complete search history.

(56) References Cited

U.S. PATENT DOCUMENTS

| | | | |
|---|---|---|---|
| 4,757,533 A | 7/1988 | Allen et al. | |
| 4,799,258 A | 1/1989 | Davies | |
| 5,052,040 A | 9/1991 | Preston et al. | |
| 5,058,164 A | 10/1991 | Elmer et al. | |
| 5,220,657 A | 6/1993 | Bly et al. | |
| 5,235,641 A | 8/1993 | Nozawa et al. | |
| 5,247,575 A | 9/1993 | Sprague et al. | |
| 5,276,735 A | 1/1994 | Boebert et al. | |
| 5,369,702 A | 11/1994 | Shanton | |
| 5,375,169 A | 12/1994 | Seheidt et al. | |
| 5,406,628 A | 4/1995 | Beller et al. | |
| 5,414,852 A | 5/1995 | Kramer et al. | |
| 5,495,533 A | 2/1996 | Linehan et al. | |
| 5,499,297 A | 3/1996 | Boebert | |
| 5,502,766 A | 3/1996 | Boebert et al. | |
| 5,535,375 A * | 7/1996 | Eshel et al. | 703/27 |
| 5,570,108 A | 10/1996 | McLaughlin et al. | |
| 5,584,023 A | 12/1996 | Hsu | |
| 5,600,722 A | 2/1997 | Yamaguchi et al. | |
| 5,655,119 A | 8/1997 | Davy | |
| 5,661,806 A | 8/1997 | Nevoux et al. | |
| 5,673,316 A | 9/1997 | Auerbach et al. | |
| 5,680,452 A | 10/1997 | Shanton | |
| 5,684,987 A | 11/1997 | Mamiya et al. | |

(Continued)

FOREIGN PATENT DOCUMENTS

EP 0 913 967 A2 5/1999

(Continued)

OTHER PUBLICATIONS

"Encrypting File System," from MSDN Oct. 2001 version, exact publication date is unknown but believed prior to Dec. 12, 2001.

(Continued)

*Primary Examiner*—David García Cervetti
(74) *Attorney, Agent, or Firm*—Sterne, Kessler, Goldstein & Fox PLLC

(57) ABSTRACT

Improved system and approaches for permitting users of different organizations to access secured files (e.g., documents) are disclosed. These users can be part of a group that is shared across a plurality of file security systems. For example, at a first file security system, a user of the shared group can secure a file for restricted access by those users within the shared group. Subsequently, at a different file security system, another user of the shared group is able to access the content of the secured file.

19 Claims, 9 Drawing Sheets

U.S. PATENT DOCUMENTS

| | | | |
|---|---|---|---|
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,729,734 A | 3/1998 | Parker et al. | |
| 5,732,265 A | 3/1998 | Dewitt et al. | |
| 5,745,573 A | 4/1998 | Lipner et al. | |
| 5,751,287 A | 5/1998 | Hahn et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,601 A | 11/1998 | Shimbo et al. | |
| 5,857,189 A * | 1/1999 | Riddle | 707/10 |
| 5,862,325 A | 1/1999 | Reed et al. | |
| 5,870,477 A | 2/1999 | Sasaki et al. | |
| 5,892,900 A | 4/1999 | Ginter et al. | |
| 5,898,781 A | 4/1999 | Shanton | |
| 5,923,754 A | 7/1999 | Angelo et al. | |
| 5,933,498 A | 8/1999 | Schnek et al. | |
| 5,953,419 A * | 9/1999 | Lohstroh et al. | 713/165 |
| 5,970,502 A | 10/1999 | Salkewicz et al. | |
| 5,987,440 A | 11/1999 | O'Neil et al. | |
| 5,999,907 A | 12/1999 | Donner | |
| 6,014,730 A * | 1/2000 | Ohtsu | 711/170 |
| 6,044,155 A | 3/2000 | Thomlinson et al. | |
| 6,069,057 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,122,630 A | 9/2000 | Strickler et al. | |
| 6,134,327 A * | 10/2000 | Van Oorschot | 380/30 |
| 6,134,660 A | 10/2000 | Boneh et al. | |
| 6,134,664 A | 10/2000 | Walker | |
| 6,141,754 A | 10/2000 | Choy | |
| 6,158,010 A | 12/2000 | Moriconi et al. | |
| 6,161,139 A | 12/2000 | Win et al. | |
| 6,182,142 B1 | 1/2001 | Win et al. | |
| 6,192,408 B1 | 2/2001 | Vahalia et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,249,873 B1 | 6/2001 | Richard et al. | |
| 6,253,193 B1 | 6/2001 | Ginter et al. | |
| 6,260,040 B1 * | 7/2001 | Kauffman et al. | 707/10 |
| 6,260,141 B1 | 7/2001 | Park | |
| 6,272,631 B1 | 8/2001 | Thomlinson et al. | |
| 6,272,632 B1 | 8/2001 | Carmen et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,308,256 B1 | 10/2001 | Folmsbee | |
| 6,308,273 B1 | 10/2001 | Goertzel et al. | |
| 6,314,409 B2 | 11/2001 | Schnek et al. | |
| 6,332,025 B2 | 12/2001 | Takahashi et al. | |
| 6,336,114 B1 | 1/2002 | Garrison | |
| 6,339,423 B1 * | 1/2002 | Sampson et al. | 715/854 |
| 6,339,825 B2 | 1/2002 | Pensak et al. | |
| 6,343,316 B1 * | 1/2002 | Sakata | 709/213 |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,357,010 B1 * | 3/2002 | Viets et al. | 726/4 |
| 6,363,480 B1 | 3/2002 | Perlman | |
| 6,389,538 B1 | 5/2002 | Gruse et al. | |
| 6,393,420 B1 | 5/2002 | Peters | |
| 6,442,695 B1 | 8/2002 | Dutcher et al. | |
| 6,446,090 B1 | 9/2002 | Hart | |
| 6,449,721 B1 * | 9/2002 | Pensak et al. | 713/171 |
| 6,490,680 B1 | 12/2002 | Scheidt et al. | |
| 6,505,300 B2 | 1/2003 | Chan et al. | |
| 6,519,700 B1 | 2/2003 | Ram et al. | |
| 6,529,956 B1 | 3/2003 | Smith et al. | |
| 6,542,608 B2 | 4/2003 | Scheidt et al. | |
| 6,549,623 B1 | 4/2003 | Scheidt et al. | |
| 6,557,039 B1 | 4/2003 | Leong et al. | |
| 6,584,466 B1 | 6/2003 | Serbinis et al. | |
| 6,587,946 B1 | 7/2003 | Jakobsson | |
| 6,594,662 B1 | 7/2003 | Sieffert et al. | |
| 6,608,636 B1 | 8/2003 | Roseman | |
| 6,611,599 B2 | 8/2003 | Natarajan | |
| 6,611,846 B1 | 8/2003 | Stoodley | |
| 6,615,349 B1 | 9/2003 | Hair | |
| 6,633,311 B1 | 10/2003 | Douvikas et al. | |
| 6,640,307 B2 | 10/2003 | Viets et al. | |
| 6,647,388 B2 | 11/2003 | Numao et al. | |
| 6,678,835 B1 | 1/2004 | Shah et al. | |
| 6,687,822 B1 | 2/2004 | Jakobsson | |
| 6,711,683 B1 | 3/2004 | Laczko et al. | |
| 6,718,361 B1 * | 4/2004 | Basani et al. | 709/201 |
| 6,775,779 B1 | 8/2004 | England et al. | |
| 6,801,999 B1 | 10/2004 | Venkatesan et al. | |
| 6,807,534 B1 | 10/2004 | Erickson | |
| 6,810,389 B1 | 10/2004 | Meyer | |
| 6,826,698 B1 | 11/2004 | Minkin et al. | |
| 6,834,341 B1 | 12/2004 | Bahl et al. | |
| 6,845,452 B1 * | 1/2005 | Roddy et al. | 726/11 |
| 6,851,050 B2 | 2/2005 | Singhal et al. | |
| 6,865,555 B2 | 3/2005 | Novak | |
| 6,877,136 B2 | 4/2005 | Bess et al. | |
| 6,892,201 B2 | 5/2005 | Brown et al. | |
| 6,892,306 B1 | 5/2005 | En-Seung et al. | |
| 6,907,034 B1 | 6/2005 | Begis | |
| 6,938,042 B2 * | 8/2005 | Aboulhosn et al. | 707/10 |
| 6,941,456 B2 * | 9/2005 | Wilson | 713/160 |
| 6,944,183 B1 | 9/2005 | Iyer et al. | |
| 6,950,936 B2 | 9/2005 | Subramaniam et al. | |
| 6,950,941 B1 | 9/2005 | Lee et al. | |
| 6,950,943 B1 | 9/2005 | Bacha et al. | |
| 6,952,780 B2 | 10/2005 | Olsen et al. | |
| 6,968,060 B1 | 11/2005 | Pinkas | |
| 6,971,018 B1 | 11/2005 | Witt et al. | |
| 6,978,376 B2 * | 12/2005 | Giroux et al. | 713/189 |
| 6,978,377 B1 | 12/2005 | Asano et al. | |
| 6,988,133 B1 | 1/2006 | Zavalkovsky et al. | |
| 6,988,199 B2 * | 1/2006 | Toh et al. | 713/170 |
| 6,993,135 B2 | 1/2006 | Ishibashi | |
| 7,003,661 B2 | 2/2006 | Beattie et al. | |
| 7,013,485 B2 * | 3/2006 | Brown et al. | 726/27 |
| 7,024,427 B2 | 4/2006 | Bobbitt et al. | |
| 7,035,910 B1 | 4/2006 | Dutta et al. | |
| 7,046,807 B2 | 5/2006 | Hirano et al. | |
| 7,058,696 B1 | 6/2006 | Phillips et al. | |
| 7,076,067 B2 | 7/2006 | Raike et al. | |
| 7,076,633 B2 * | 7/2006 | Tormasov et al. | 711/203 |
| 7,096,266 B2 | 8/2006 | Lewin et al. | |
| 7,107,416 B2 | 9/2006 | Stuart et al. | |
| 7,117,322 B2 | 10/2006 | Hochberg et al. | |
| 7,124,164 B1 * | 10/2006 | Chemtob | 709/204 |
| 7,134,041 B2 | 11/2006 | Murray et al. | |
| 7,136,903 B1 * | 11/2006 | Phillips et al. | 709/217 |
| 7,146,388 B2 | 12/2006 | Stakutis et al. | |
| 7,146,498 B1 | 12/2006 | Takechi et al. | |
| 7,171,557 B2 * | 1/2007 | Kallahalla et al. | 713/165 |
| 7,177,427 B1 | 2/2007 | Komuro et al. | |
| 7,181,017 B1 | 2/2007 | Nagel et al. | |
| 7,194,764 B2 | 3/2007 | Martherus et al. | |

| | | |
|---|---|---|
| 7,200,747 B2 * | 4/2007 | Riedel et al. ............... 713/165 |
| 7,203,317 B2 * | 4/2007 | Kallahalla et al. ........... 380/278 |
| 7,203,968 B2 | 4/2007 | Asano et al. |
| 7,219,230 B2 * | 5/2007 | Riedel et al. ............... 713/165 |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,260,555 B2 * | 8/2007 | Rossmann et al. ............ 705/51 |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,380,120 B1 * | 5/2008 | Garcia ...................... 713/160 |
| 7,383,586 B2 * | 6/2008 | Cross et al. .................. 726/30 |
| 7,386,529 B2 * | 6/2008 | Kiessig et al. ................. 707/1 |
| 7,406,596 B2 * | 7/2008 | Tararukhina et al. ........ 713/165 |
| 2001/0011254 A1 | 8/2001 | Clark |
| 2001/0034839 A1 | 10/2001 | Karjoth et al. |
| 2001/0044903 A1 | 11/2001 | Yamamoto et al. |
| 2002/0010679 A1 | 1/2002 | Felsher |
| 2002/0016922 A1 | 2/2002 | Richards et al. |
| 2002/0046350 A1 | 4/2002 | Lordemann et al. |
| 2002/0050098 A1 | 5/2002 | Chan |
| 2002/0062240 A1 | 5/2002 | Morinville |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0099947 A1 | 7/2002 | Evans |
| 2002/0124180 A1 | 9/2002 | Hagman |
| 2002/0129235 A1 | 9/2002 | Okamoto et al. |
| 2002/0143710 A1 | 10/2002 | Liu |
| 2002/0143906 A1 * | 10/2002 | Tormasov et al. ........... 709/220 |
| 2002/0157016 A1 * | 10/2002 | Russell et al. ............... 713/200 |
| 2002/0169965 A1 | 11/2002 | Hale et al. |
| 2002/0176572 A1 | 11/2002 | Ananth |
| 2002/0194484 A1 | 12/2002 | Bolosky et al. |
| 2002/0198798 A1 | 12/2002 | Ludwig et al. |
| 2003/0014391 A1 | 1/2003 | Evans et al. |
| 2003/0028610 A1 * | 2/2003 | Pearson ...................... 709/213 |
| 2003/0033528 A1 | 2/2003 | Ozog et al. |
| 2003/0037237 A1 | 2/2003 | Abgrall et al. |
| 2003/0046238 A1 | 3/2003 | Nonaka et al. |
| 2003/0056139 A1 | 3/2003 | Murray et al. |
| 2003/0081784 A1 * | 5/2003 | Kallahalla et al. ........... 380/277 |
| 2003/0081787 A1 * | 5/2003 | Kallahalla et al. ........... 380/278 |
| 2003/0081790 A1 * | 5/2003 | Kallahalla et al. ........... 380/281 |
| 2003/0101072 A1 | 5/2003 | Dick et al. |
| 2003/0110266 A1 | 6/2003 | Rollins et al. |
| 2003/0115146 A1 | 6/2003 | Lee et al. |
| 2003/0115570 A1 | 6/2003 | Bisceglia |
| 2003/0126434 A1 * | 7/2003 | Lim et al. ................... 713/164 |
| 2003/0159066 A1 | 8/2003 | Staw et al. |
| 2003/0182579 A1 | 9/2003 | Leporini et al. |
| 2003/0196096 A1 | 10/2003 | Sutton |
| 2003/0197729 A1 * | 10/2003 | Denoue et al. ............... 345/751 |
| 2003/0217264 A1 | 11/2003 | Martin et al. |
| 2003/0226013 A1 * | 12/2003 | Dutertre ...................... 713/163 |
| 2003/0233650 A1 * | 12/2003 | Zaner et al. .................... 725/32 |
| 2004/0022390 A1 | 2/2004 | McDonald et al. |
| 2004/0039781 A1 * | 2/2004 | LaVallee et al. ............. 709/205 |
| 2004/0041845 A1 | 3/2004 | Alben et al. |
| 2004/0068524 A1 * | 4/2004 | Aboulhosn et al. .......... 707/200 |
| 2004/0088548 A1 * | 5/2004 | Smetters et al. ............. 713/175 |
| 2004/0103202 A1 * | 5/2004 | Hildebrand et al. ......... 709/229 |
| 2004/0103280 A1 * | 5/2004 | Balfanz et al. .............. 713/169 |
| 2004/0133544 A1 * | 7/2004 | Kiessig et al. .................. 707/1 |
| 2004/0158586 A1 * | 8/2004 | Tsai ........................... 707/200 |
| 2004/0186845 A1 * | 9/2004 | Fukui ......................... 707/100 |
| 2004/0193905 A1 | 9/2004 | Lirov et al. |
| 2004/0199514 A1 * | 10/2004 | Rosenblatt et al. ............ 707/10 |
| 2004/0215956 A1 | 10/2004 | Venkatachary et al. |
| 2004/0254884 A1 * | 12/2004 | Haber et al. .................. 705/51 |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0091289 A1 * | 4/2005 | Shappell et al. ............. 707/201 |
| 2005/0177858 A1 | 8/2005 | Ueda |
| 2005/0235154 A1 | 10/2005 | Serret-Avila |
| 2005/0256909 A1 * | 11/2005 | Aboulhosn et al. .......... 707/200 |
| 2005/0283610 A1 | 12/2005 | Serret-Avila et al. |
| 2006/0168147 A1 | 7/2006 | Inoue et al. |
| 2007/0067837 A1 | 3/2007 | Schuster |

FOREIGN PATENT DOCUMENTS

| | | |
|---|---|---|
| EP | 1 107 504 B1 | 6/2001 |
| EP | 1324565 A1 * | 7/2003 |
| WO | WO 96/41288 A1 | 12/1996 |
| WO | WO 01/77783 A2 | 10/2001 |

OTHER PUBLICATIONS

"Features of EFS" from MSDN Oct. 2001 version, exact publication date is unknown but believed prior to Dec. 12, 2001.

"Windows 2000 EFS" in the Apr. 1999 issue of Windows NT magazine.

"How EFS works," from MSDN Oct. 2001 version, exact publication date is unknown but believed prior to Dec. 12, 2001.

"Inside Encrypting file system," Part 1, from MSDN Oct. 2001 version, exact publication date is unknown but believed prior to Dec. 12, 2001.

"Inside Encrypting file system," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

Examination Report, completion date Jun. 18, 2008, for European Patent Application No. EP 02 258 532.7-1244, 6 pgs.

Boneh et al., "Hierarchical Identity Based Encryption with Constant Size Ciphertext," Advances in Cryptology- Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

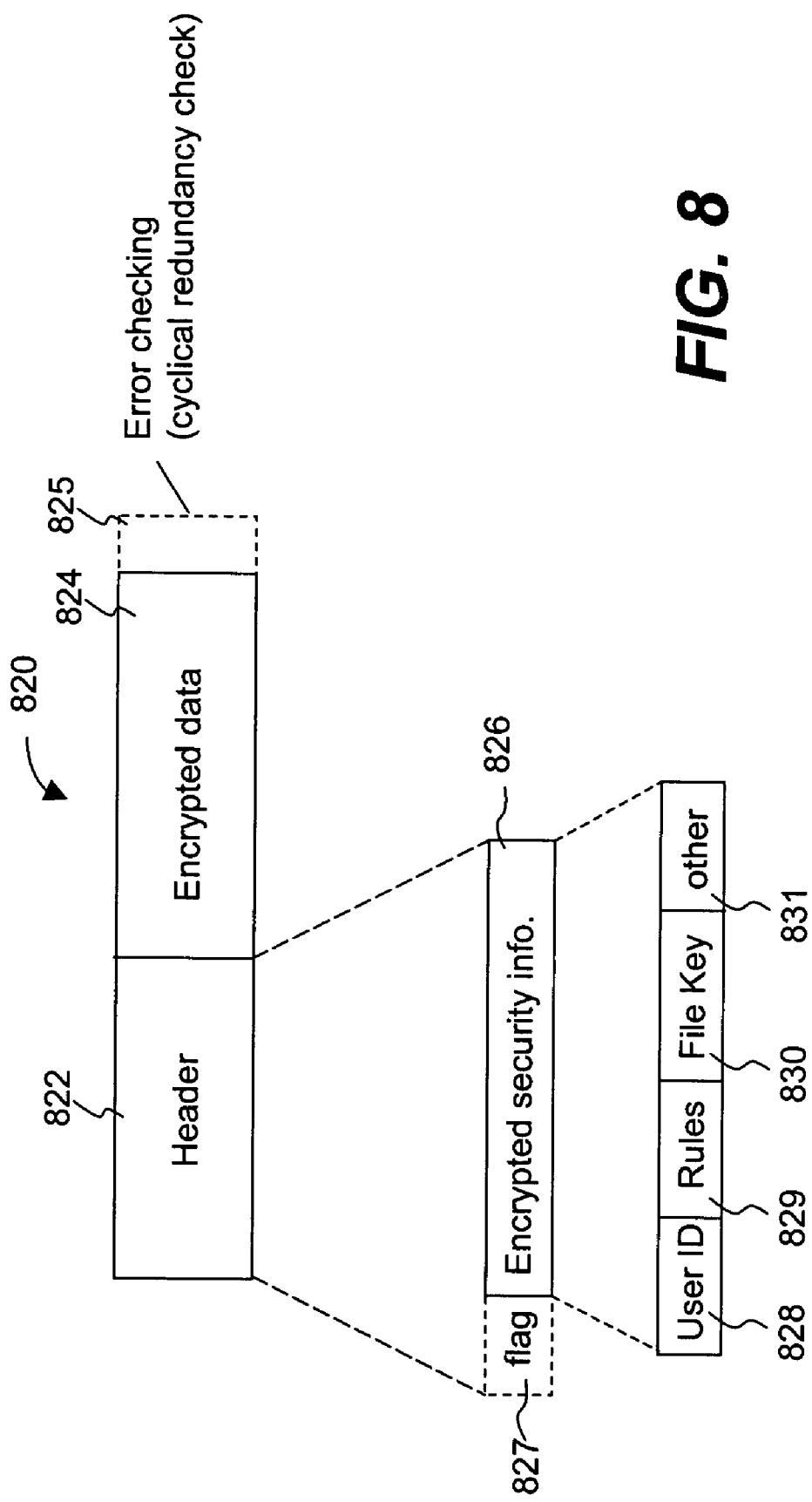

US 7,730,543 B1

METHOD AND SYSTEM FOR ENABLING USERS OF A GROUP SHARED ACROSS MULTIPLE FILE SECURITY SYSTEMS TO ACCESS SECURED FILES

CROSS-REFERENCE TO RELATED APPLICATION

This application is related to U.S. patent application Ser. No. 10/262,218, filed Sep. 30, 2002, and entitled "DOCUMENT SECURITY SYSTEM THAT PERMITS EXTERNAL USERS TO GAIN ACCESS TO SECURED FILES," which is hereby incorporated by reference for all purposes. This application is also related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security measures, an unauthorized person or machine may intercept any information traveling across the Internet, and may even get access to proprietary information stored in computers that interconnect to the Internet, but are otherwise generally inaccessible by the public.

As organizations become more dependent on networks for business transactions, data sharing, and everyday communications, their networks have to be increasingly accessible to customers, employees, suppliers, partners, contractors and telecommuters. Unfortunately, as the accessibility increases, so does the exposure of critical data that is stored on the network. Hackers can threaten all kinds of valuable corporate information resources including intellectual property (e.g., trade secrets, software code, and prerelease competitive data), sensitive employee information (e.g., payroll figures and HR records), and classified information (e.g., passwords, databases, customer records, product information, and financial data). Thus data security is becoming increasingly mission-critical.

There are many efforts in progress aimed at protecting proprietary information traveling across the Internet and controlling access to computers carrying the proprietary information. Every day hundreds of millions of people interact electronically, whether it is through e-mail, e-commerce (business conducted over the Internet), ATM machines or cellular phones. The perpetual increase of information transmitted electronically has led to an increased reliance on cryptography.

In protecting the proprietary information traveling across the Internet, one or more cryptographic techniques are often used to secure a private communication session between two communicating computers on the Internet. Cryptographic techniques provide a way to transmit information across an unsecure communication channel without disclosing the contents of the information to anyone eavesdropping on the communication channel. An encryption process is a cryptographic technique whereby one party can protect the contents of data in transit from access by an unauthorized third party, yet the intended party can read the data using a corresponding decryption process.

Many organizations have deployed firewalls, Virtual Private Networks (VPNs), and Intrusion Detection Systems (IDS) to provide protection. Unfortunately, these various security means have been proven insufficient to reliably protect proprietary information residing on their internal networks. For example, depending on passwords to access sensitive documents from within often causes security breaches when the password of a few characters long is leaked or detected.

Enterprise security solutions secure data within an enterprise premise (e.g., internal networks). Some enterprise security solutions prohibit external users (clients) to have any access to secured data. However, users of different enterprises often need to access the same set of electronic files. Unfortunately, each enterprise security solution conventionally only permits its own authorized users to access its secured files. Hence, users of different enterprises are not able to be members of a shared group of users and thus cannot easily share secured files.

Thus, there is a need for improved approaches to enable file security systems to permit users of different enterprise security systems to access secured data without compromising the integrity of the enterprise security systems.

SUMMARY OF THE INVENTION

Generally speaking, the invention relates to an improved system and approaches for permitting users of different organizations to access secured files (e.g., documents). These users can be part of a group that is shared across a plurality of file security systems. For example, at a first file security system, a user of the shared group can secure a file for restricted access by those users within the shared group. Subsequently, at a different file security system, another user of the shared group is able to access the contents of the secured file.

The invention can be implemented in numerous ways, including as a method, system, device, and computer readable medium. Several embodiments of the invention are discussed below.

As a security system that restricts access to electronic files, one embodiment of the invention includes at least: a first file security system of a first business entity that secures electronic files for restricted access by those users within a shared group; and a second file security system of a second business entity that secures electronic files for restricted access by those users within the shared group. The users within the shared group include at least one user from the first business entity and at least one user from the second business entity.

As a method for interacting between file security systems, one embodiment of the invention includes at least: creating a shared group at a first file security system; adding a second file security system to the shared group; permitting one or more users of the first file security system to be within the shared group; and permitting one or more users of the second file security system to be within the shared group.

As a computer readable medium including at least computer program code for interacting between file security systems, one embodiment of the invention includes at least: computer program code for creating a shared group at a first file security system; computer program code for adding a second file security system to the shared group; computer program code for permitting one or more users of the first file security system to be within the shared group; and computer program code for permitting one or more users of the second file security system to be within the shared group.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which:

FIG. 8 shows an exemplary data structure of a secured file that may be used in one embodiment of the invention.

DETAILED DESCRIPTION OF THE INVENTION

Figure 1:
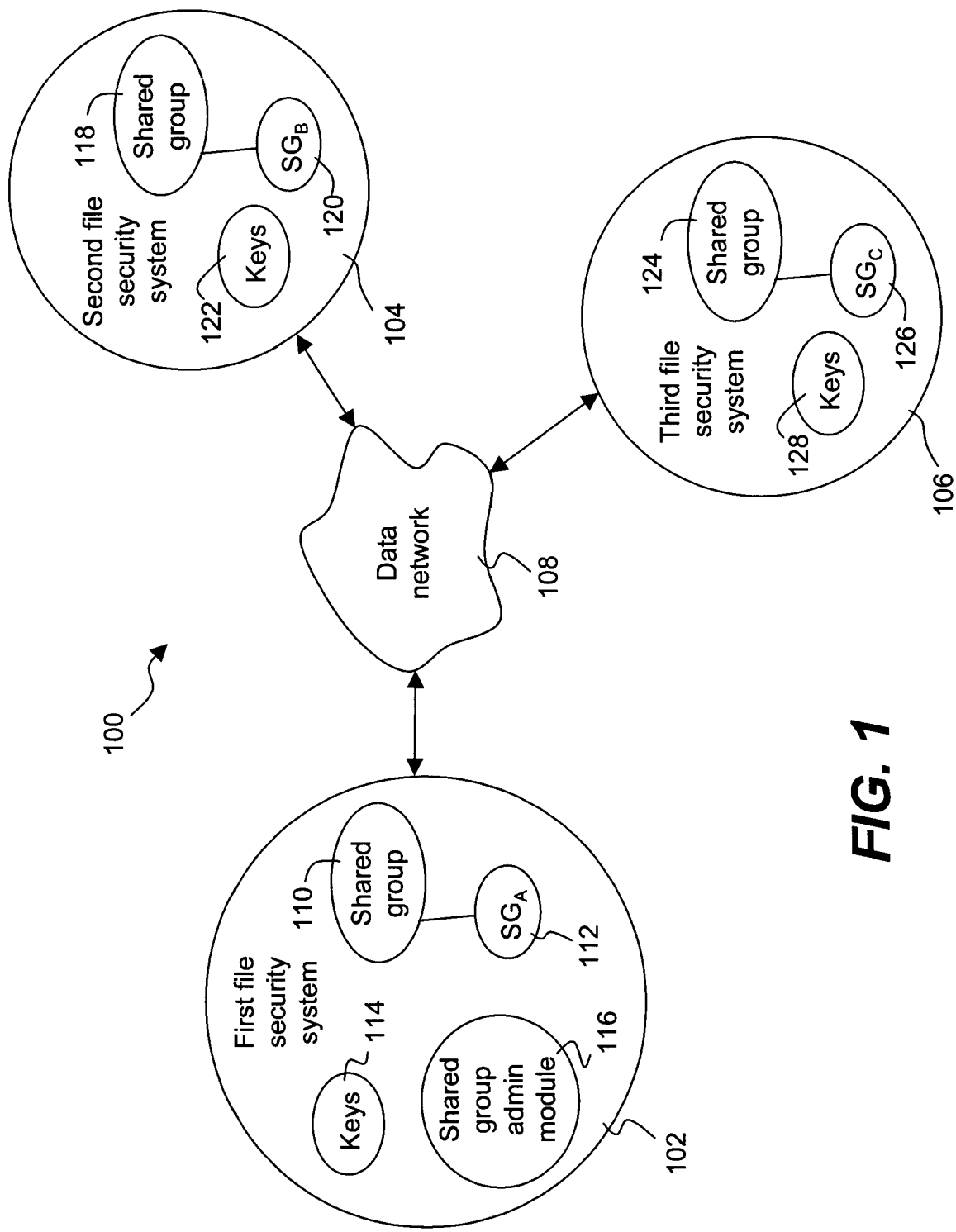
FIG. 1 is a block diagram of an arrangement of file security systems according to one embodiment of the invention.

The invention relates to an improved system and approaches for permitting users of different organizations to access secured files (e.g., documents). These users can be part of a group that is shared across a plurality of file security systems. For example, at a first file security system, a user of the shared group can secure a file for restricted access by those users within the shared group. Subsequently, at a different file security system, another user of the shared group is able to access the contents of the secured file. The different organizations typically represent different enterprises (e.g., companies).

In general, a file security system (or document security system) serves to limit access to files (documents) to authorized users. Often, an organization, such as a company, would use a file security system to limit access to its files (documents). For example, users of a group might be able to access files (documents) pertaining to the group, whereas other users not within the group would not be able to access such files (documents). Such access, when permitted, would allow a user of the group to retrieve a copy of the file (document) via a data network. According to one aspect of the invention, the users of the group can be associated with different file security systems.

Secured files are files that require one or more keys, passwords, access privileges, etc. to gain access to their content. According to one aspect of the invention, the security is provided through encryption and access rules. The files, for example, can pertain to documents, multimedia files, data, executable code, images text. In general, a secured file can only be accessed by authenticated users with appropriate access rights or privileges. In one embodiment, each secured file is provided with a header portion and a data portion, where the header portion contains or points to security information. The security information is used to determine whether access to associated data portions of secured files is permitted.

In the following description, numerous specific details are set forth in order to provide a thorough understanding of the invention. However, it will become obvious to those skilled in the art that the invention may be practiced without these specific details. The description and representations used herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations of the invention.

Embodiments of the present invention are discussed herein with reference to FIGS. 1-8. However, those skilled in the art will readily appreciate that the detailed description given herein with respect to these figures is for explanatory purposes as the invention extends beyond these limited embodiments.

FIG. 1 is a block diagram of an arrangement 100 of file security systems according to one embodiment of the invention. The arrangement 100 includes a first file security system 102, a second file security system 104 and a third file security system 106. The file security systems 102, 104 and 106 are connected or connectable to a data network 108. In one implementation, the different file security systems are associated with different business entities.

Each of the file security systems 102, 104 and 106 operate to secure electronic files (e.g., electronic documents) and then restrict access to the secured electronic files. Further, each of the file security systems 102, 104 and 106 supports use by multiple users and may provide at least a central server for each file security system and potentially other servers within the respective file security system. However, instead of central servers, the file security systems 102, 104 and 106 can communicate in a peer-to-peer manner. In other words, each file security system 102, 104 and 106 operates primarily independently to secure its domain of electronic files. Nevertheless, according to the invention, to facilitate sharing of certain electronic files between the different file security systems, a shared group is utilized. Any electronic file that has been secured for use by members of the shared group can access the secured electronic file, regardless of which of the different file security systems the users are associated with.

More particularly, the first file security system 102 includes a shared group 110. The shared group 110 has certain users $SG_A$ 112 that are members of the shared group 110. These users $SG_A$ 112 are affiliated with the first file security system 102. Hence, it is these users $SG_A$ 112 that are able to access the electronic files that are made available to members of the shared group. In doing so, the users $SG_A$ 112 that are members of the shared group are able to receive certain keys 114 that are utilized by the users $SG_A$ 112 to encrypt and decrypt electronic files for access only by members of the shared group. The first file security system 102 also includes a shared group administrator module 116. The shared group administrator module 116 operates to enable an administrator of the first file security system 102 to manage creation of the shared group, admission of a file security system into the shared group, removal of a file security system from the shared group, or transfer of the administrative tasks to another of the file security systems within the shared group.

The second file security system 104 includes a shared group 118. The shared group 118 has certain users $SG_B$ 120 that are affiliated with the second file security system 104. These users $SG_B$ 120 are, in effect, members of the same group as the users $SG_A$ 112. That is, the shared groups 110 and 118 are portions of the same shared group. Further, the second file security system 104 includes certain keys 122 that are utilized by the users $SG_B$ 120 to encrypt and/or decrypt electronic files for access only by the members of the shared group.

The third file security system 106 includes a shared group 124. The shared group 124 has certain users $SG_C$ 126 that are members of the shared group 124. These users $SG_C$ 126 are affiliated with the third file security system 106. The shared group 124 is the same shared group as the shared group 110 and the shared group 118. Also, the third file security system 106 includes certain keys 128 that are utilized by the users $SG_C$ 126 in order to encrypt and/or decrypt electronic files for access only by the members of the shared group. The keys 114, 118, and 128 used by the shared group are normally identical.

Figure 2:
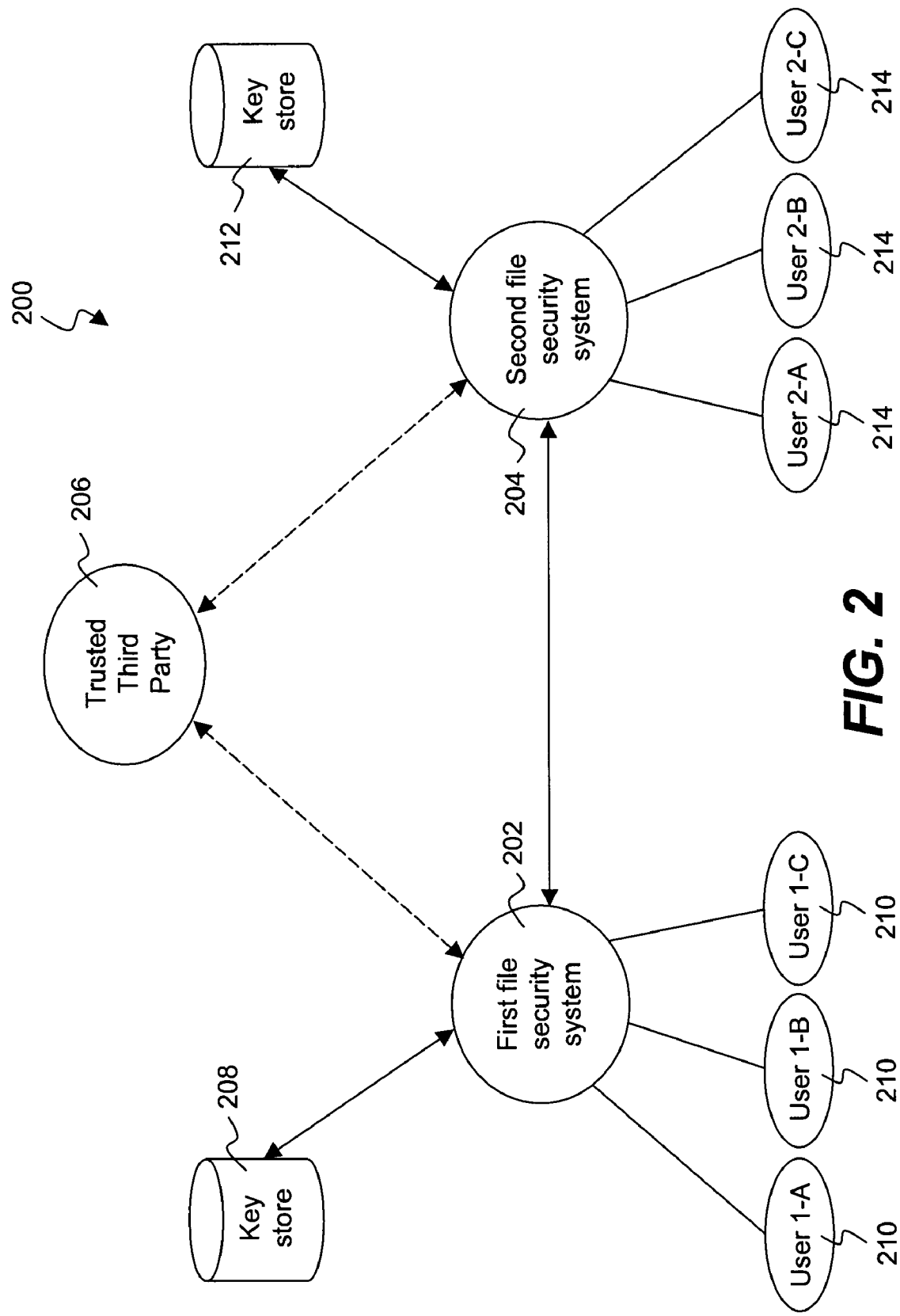
FIG. 2 is a block diagram of a pair of file security systems according to one embodiment of the invention.

FIG. 2 is a block diagram of a pair of file security systems 200 according to one embodiment of the invention. The pair of file security systems 200 includes a first file security system 202 and a second file security system 204. In general, the file security systems 202 and 204 operate to restrict access to electronic files. For example, the first file security system 202 can, for example, be configured as the first file security system 102 illustrated in FIG. 1, and the second file security system 204 can, for example, be configured as the second file security system 104 illustrated in FIG. 1. Typically the first file security system 202 and the second file security system 204 operate independently. However, 202 and 204 can perform limited communication. This limited communication can be used to manage the utilization of one or more shared groups between the file security systems 202 and 204. To ensure secure communication between 202 and 204, which are typically in different companies, trust can be established bilaterally or through a trusted third party 206 using authentication methods well known to those in the art. The various management activities with respect to shared groups are discussed in more detail below with respect to FIGS. 3-6 but can, for example, generally include one or more of: setting up a shared group, adding members to a shared group, removing member from a shared group, and setting up or transferring a shared group administrator.

Further, as illustrated in FIG. 2, the first file security system 202 can couple to a key store 208 that stores a plurality of cryptographic keys that are utilized by the first file security system 202. The keys can be symmetric or public-private key pairs. The first file security system 202 allows a plurality of users 210 to interact therewith to secure electronic files for restricting access or to unsecure previously secured electronic files for gaining access. As an example, users 210 can have accounts with the first file security system 202 such that they can secure electronic files using the first file security system or access secured electronic files as appropriate given the access restrictions placed on electronic files.

The second file security system 204 also couples to a key store 212 that stores a plurality of cryptographic keys that are utilized by the second file security system. Again, the keys can be symmetric or public-private key pairs. Also, the second file security system 204 permits a plurality of users 214 to have user accounts with the second file security system 204 and thus access secure electronic files as appropriate given the access restrictions placed on electronic files. Electronic files having their access restricted to those users within the shared group can be accessed by any of the users within the shared group, regardless of whether they are users affiliated with the first file security system 202 or the second file security system 204. For example, if user 1-A and user 2-C shown in FIG. 2 are members of the same shared group, then user 2-C could access the content of (decrypt) an electronic file previously secured (encrypted) by user 1-A.

Figure 3:
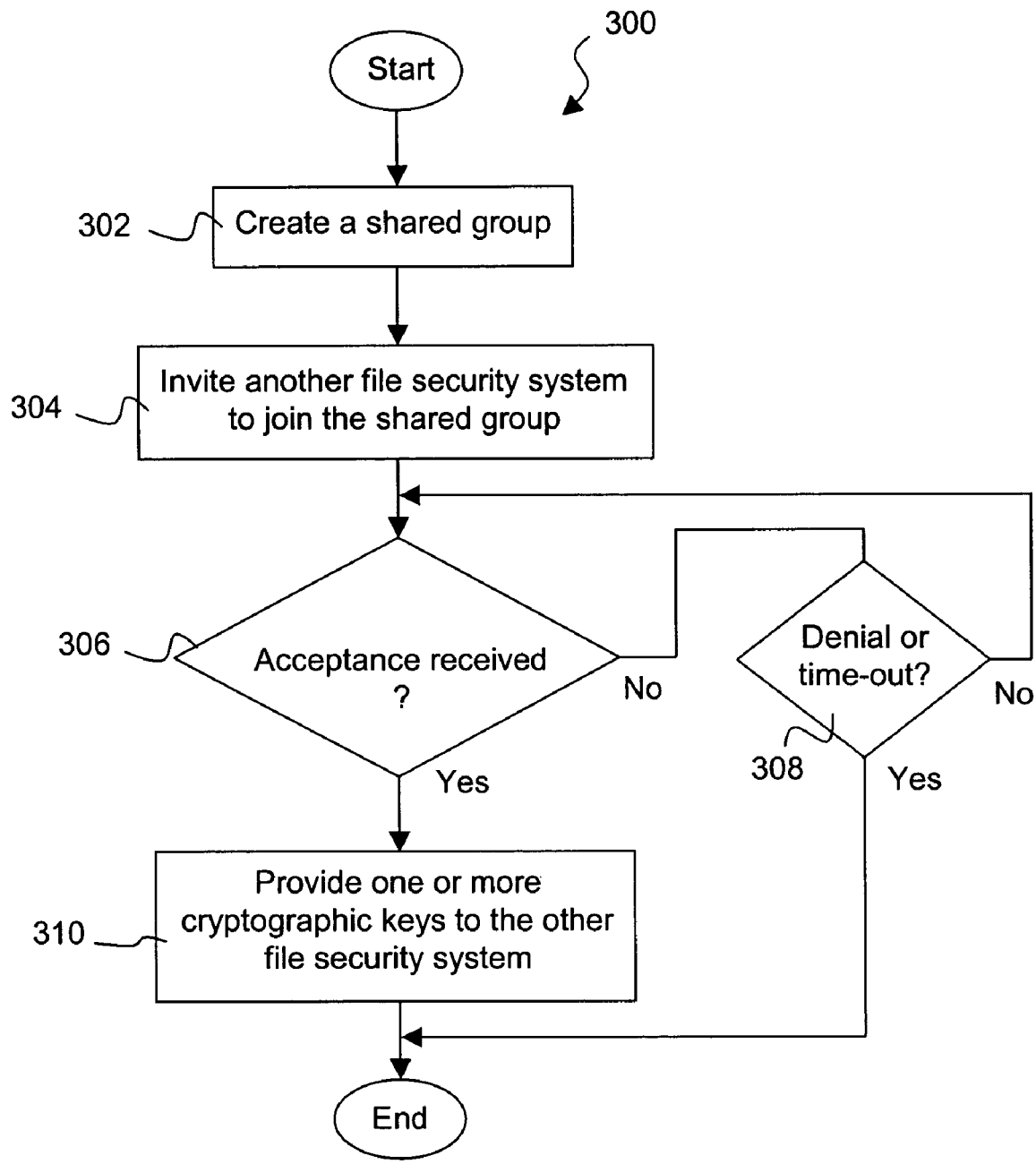
FIG. 3 is a flow diagram of shared group setup processing according to one embodiment of the invention.

FIG. 3 is a flow diagram of shared group setup processing 300 according to one embodiment of the invention. The shared group setup processing 300 is performed by a file security system. In one example, the shared group setup processing 300 is performed by the first file security system 102 illustrated in FIG. 1. Namely, the shared group setup processing 300 can be performed by the shared group administrator module 116 as illustrated in FIG. 1.

The shared group setup processing 300 initially creates 302 a shared group. A shared group is a group of one or more users affiliated with one or more different file security systems. Typically, a shared group is a group that is shared across multiple file security systems. Each of the one or more different file security systems can permit one or more of its own users to be within the shared group.

Once the shared group has been created 302, another file security system (that is to be included within the shared group) is invited 304 to join the shared group. The invitation offers the other file security system the opportunity to join the shared group. Here, in general, one or more file security systems can be invited 304 to join the shared group. After the other file security system has been invited 304 to join the shared group, a decision 306 determines whether the other file security system that has been invited has accepted the invitation to join the shared group. In other words, the decision 306 determines whether an acceptance of the invitation has been received. When the decision 306 determines that an acceptance has not yet been received, then a decision 308 determines whether a denial (i.e., non-acceptance) or a time-out has occurred. When the decision 308 determines that a denial has not been received and that a time-out has not yet been reached, then the shared group setup processing 300 returns to repeat the decision 306 to continue to wait for a response to the invitation. The response to the invitation can be either an acceptance or a denial. When the decision 308 determines that a denial has been received or that a time-out has occurred, then the shared group setup processing 300 is complete and ends because the other file security system that has been invited to join the shared group has either denied (i.e., refused) the invitation or not timely responded to the invitation.

On the other hand, when the decision 306 determines that an acceptance has been received from the other file security system, then one or more cryptographic keys are provided 310 to the other file security system. The cryptographic keys are eventually used by the users of the other file security system that are members of the shared group when securing or accessing the content of electronic files to be accessible by the shared group. Following the operation 310, the shared group setup processing 300 is complete and ends.

Figure 4:
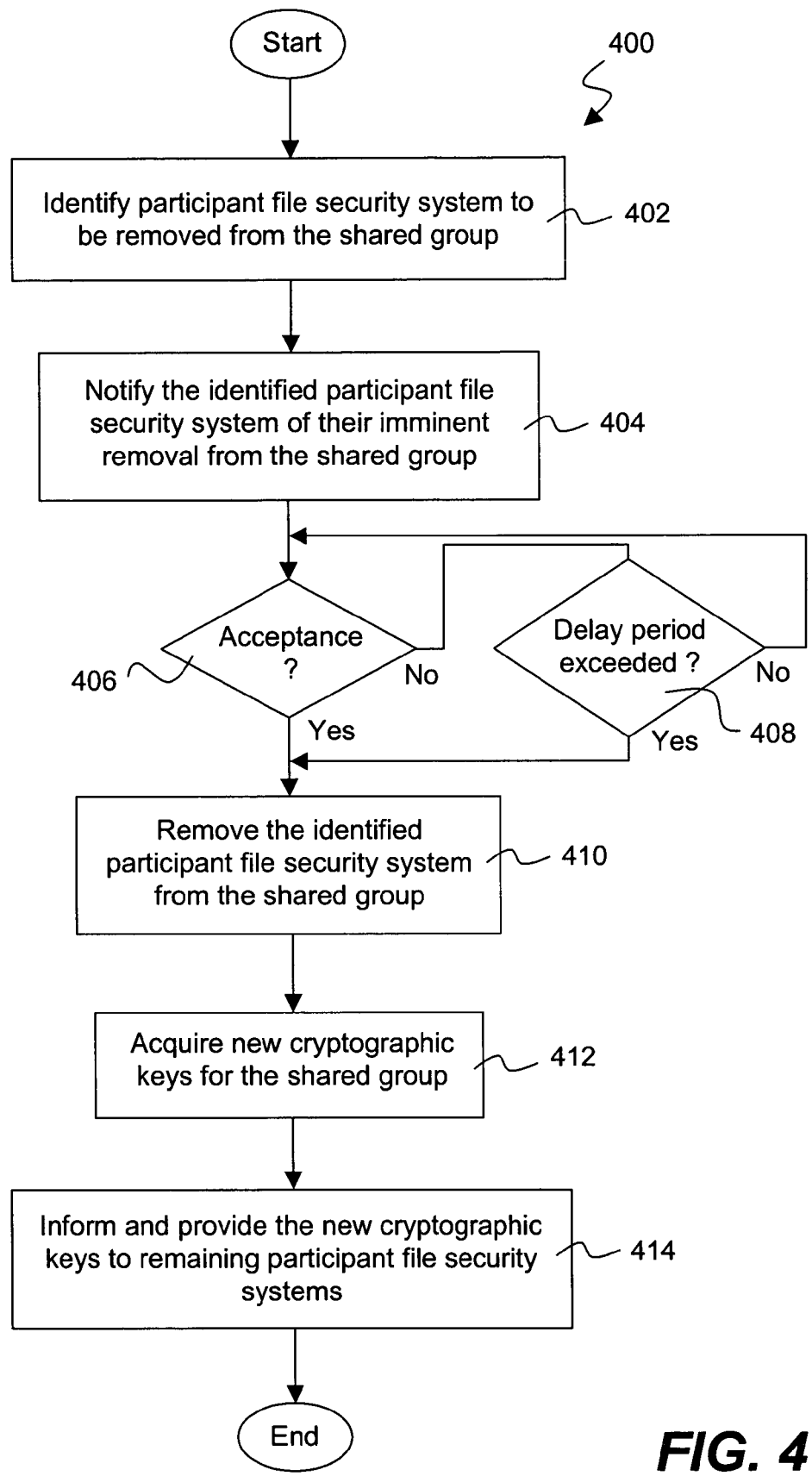
FIG. 4 is a flow diagram of termination processing according to one embodiment of the invention.

FIG. 4 is a flow diagram of termination processing 400 according to one embodiment of the invention. The termination processing 400 is performed by a file security system having shared group administrative operations for the shared group. The termination processing 400 can, for example, be performed by the first file security system 102 illustrated in FIG. 1. Namely, the termination processing 400 can be performed by the shared group administrator module 116 as illustrated in FIG. 1.

The termination processing 400 initially identifies 402 a participant file security system to be removed from the shared group. For whatever reason, the identified participant file security system is to be removed from the shared group. Hence, the identified participant file security system is notified 404 of their imminent removal from the shared group.

Next, a decision 406 determines whether the identified participant file security system has indicated acceptance of their removal from the shared group. When the decision 406 determines that such acceptance has not yet been received, then a decision 408 determines whether a delay period has been exceeded. When the decision 408 determines that the delay period has not been exceeded, then the termination processing 400 returns to repeat the decision 406 and subsequent operations.

On the other hand, when the decision 406 indicates that such acceptance has been received from the identified participant file security system, as well as following the decision 408 when the delay period has been exceeded, the identified participant file security system is removed 410 from the shared group. In other words, the shared group has been modified at this point such that any users of the identified participant file security system that were previously entitled to access electronic files associated with the shared group are no longer able to access any newly created electronic files secured by such means. As a result, the users of the identified participant file security system that were associated with the shared group are no longer members of the shared group. In one embodiment, these users, however, remain eligible to access previously created and secured electronic files that were so created and secured while the users of the participant file security system were members of the shared group.

Following or concurrent with the removal 410 of the identified participant file security system from the shared group, new cryptographic keys for the shared group are acquired 412. The remaining participant file security systems are informed and provided 414 with the new cryptographic keys. In other words, the cryptographic keys used by the file security systems affiliated with the shared group are changed (e.g., rotated), such that, going forward, new cryptographic keys are utilized to secure and subsequently unsecure electronic documents affiliated with the shared group. Following the operation 414, the termination processing 400 is complete and ends.

Figure 5A:
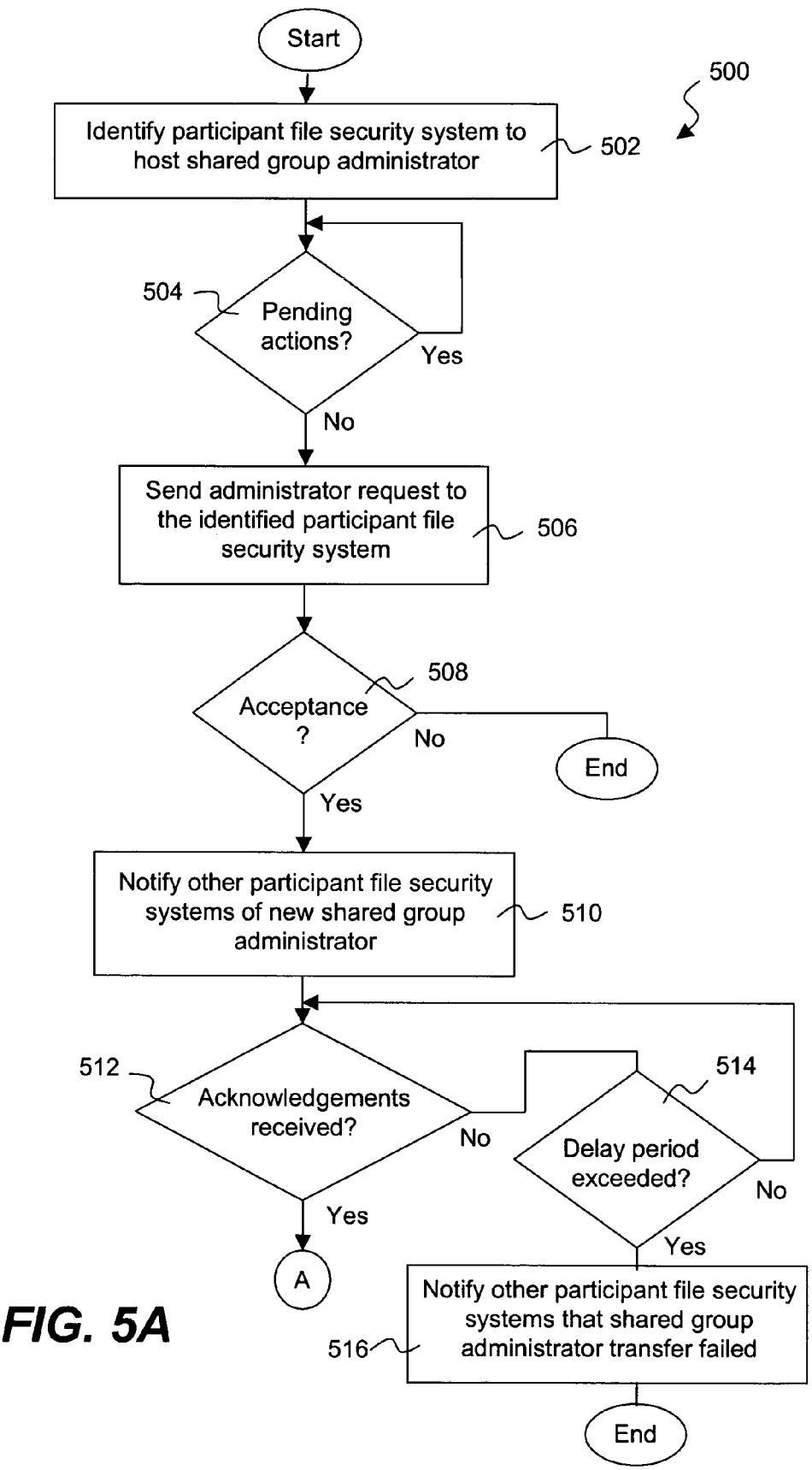
FIGS. 5A and 5B are flow diagrams of administrative transfer processing according to one embodiment of the invention.
Figure 5B:
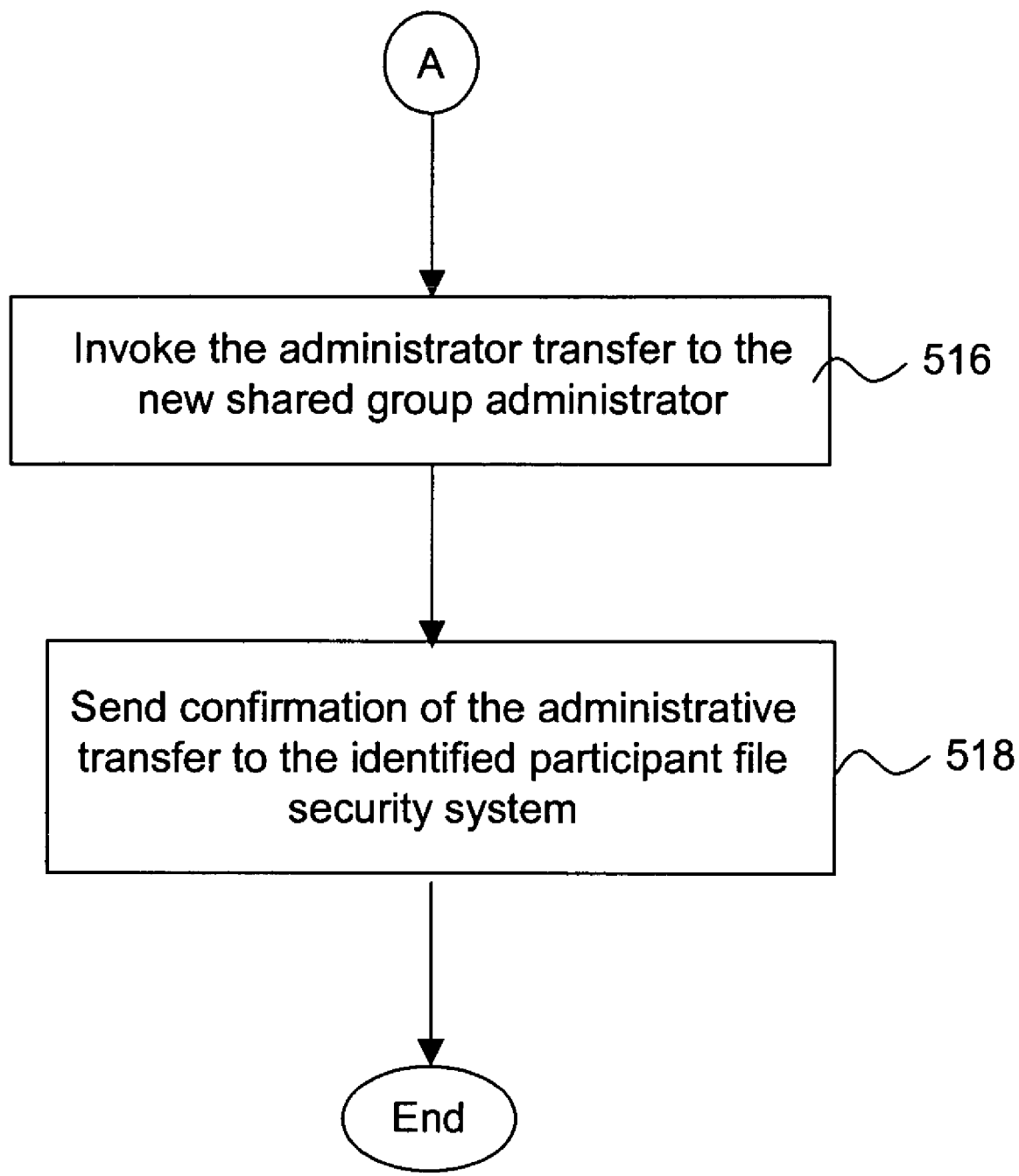

FIGS. 5A and 5B are flow diagrams of administrative transfer processing 500 according to one embodiment of the invention. The administrative transfer processing 500 transfers shared group administrative responsibilities from one file security system to another. The administrative transfer processing 500 can, for example, be performed by the first file security system 102 illustrated in FIG. 1. Namely, the administrative transfer processing 500 can be performed by the shared group administrator module 116 as illustrated in FIG. 1.

The administrative transfer processing 500 initially identifies 502 a participant file security system to host a shared group administrator. Typically, a shared group has a plurality of participant file security systems. At any given point in time, one of the participant file security systems hosts the administrator for the shared group, namely, the shared group administrator. With respect to the arrangement 100 of the file security systems shown in FIG. 1, the shared group administrator is, for example, the shared group administrator 116 the first file security system 102. With respect to FIG. 1, the participant file security system being identified 502 would be the second file security system 104 or the third file security system 106.

Next, a decision 504 determines whether there are any actions pending with respect to the shared group administrator. As long as there are actions that are pending, the administrative transfer processing 500 awaits completion of such actions. Once the decision 504 determines that there are no pending actions, then an administrator transfer request is sent 506 to the identified participant file security system. Here, the file security system to be the recipient of the administrative responsibilities for the shared group is sent 506 the administrator transfer request. Typically, the administrator transfer request is sent 506 by the shared group administrator at the host file security system to the identified participant file security system. For example, the shared group administrator 116 of the first file security system 102 shown in FIG. 1 can send 506 the request.

Next a decision 508 determines whether the identified participant file security system that has been sent 506 the administrator transfer request has accepted the administrator transfer request. Typically, an administrator for the identified participant file security system that has received the administrator transfer request determines whether or not to accept the transfer. When the decision 508 determines that the identified participant file security system declines to host the shared group administrator, then the administrative transfer processing 500 is complete and ends because the requested administrative transfer has been declined by the recipient file security system.

On the other hand, when the decision 508 determines that the identified participant file security system has accepted the administrative transfer request of the shared group administrator, the administrative transfer processing 500 continues. In this regard, other participant file security systems are notified 510 of the new shared group administrator. Next, a decision 512 determines whether the other participant file security systems have acknowledged receiving the notifications. Here, in one embodiment, the administrative transfer processing 500 requires all of the other participant file security systems to acknowledge their receipt of the notification of the new shared group administrator. Hence, when the decision 512 determines that all acknowledgements have not been received, a decision 514 determines whether a delay period has been exceeded. When the decision 514 determines that a delay period has been exceeded, then the administrative transfer processing 500 notifies 516 the other participant file security systems that the administrative transfer attempt has failed, and thus the current administrator remains. Following the operation 516, the administrative transfer processing 500 is complete and ends without implementing the requested administrative transfer because the other participant file security systems did not acknowledge the change. On the other hand, when the decision 514 determines that the delay period has not been exceeded, then the administrative transfer processing 500 returns to repeat the decision 512 and subsequent operations.

Alternatively, once the decision 512 determines that all of the acknowledgements from the other participant file security systems have been received, the administrator transfer to the new shared group administrator is invoked 516. In this regard, the new shared group administrator (or shared group administrative module) is activated in the identified participant file security system, while the previous shared group administrator (or shared group administrative module) from a different file security system is deactivated. Then, a confirmation of the administrative transfer to the identified participant file security system is sent 518. Following the operation 518, the administrative transfer processing 500 is complete and ends.

Figure 6:
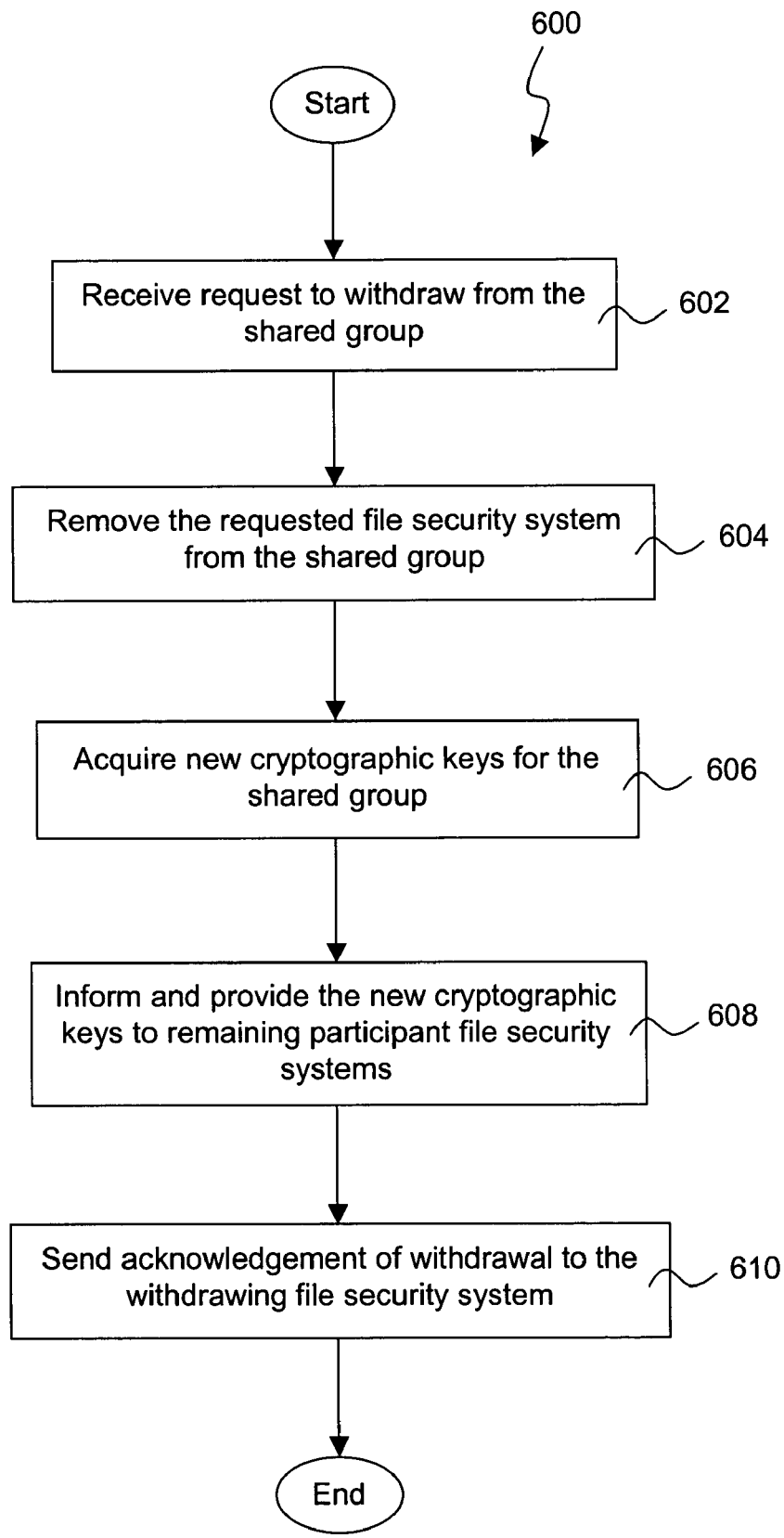
FIG. 6 is a flow diagram of withdrawal processing according to one embodiment of the invention.

FIG. 6 is a flow diagram of withdrawal processing 600 according to one embodiment of the invention. The withdrawal processing 600 enables a participant file security system to withdraw from its group membership. The withdrawal processing 600 can, for example, be performed by the first file security system 102 illustrated in FIG. 1. Namely, the termination processing 400 can be performed by the shared group administrator module 116 as illustrated in FIG. 1.

The withdrawal processing 600 initially receives 602 a request to withdraw from the shared group. Here, the request to withdraw from the shared group is received at the file security system hosting the shared group administrator from a different file security system that is currently within the shared group. After the request to withdraw from the shared group has been received 602, the requesting file security system is removed 604 from the shared group. Here, in one embodiment, it is assumed that when the request to withdraw from the shared group is received, that the shared group administrator at the host file security system will accept such request and promptly process such. In other words, the removal 604 causes the shared group to be modified such that any users of the requesting participant file security system that were previously entitled to access electronic files associated with the shared group are no longer able to access any newly created and secured electronic files associated with the shared group. As a result, the users of the requesting file security system that were associated with the shared group are no longer members of the shared group. In one embodiment, these users, however, remain eligible to access previously created and secured electronic files that were so created and secured while the users of the requesting file security system were members of the shared group.

Further, once the request to withdraw is accepted and processed, the file security system being withdrawn can modify its configuration such that the shared group being withdrawn from is no longer available as a selectable item at the remaining participant file security systems of the shared group. In other words, the users of the withdrawn file security system can no longer encrypt electronic files for use by the shared group. However, in some embodiments, previously encrypted files associated with the shared group are still able to be accessed by prior users/members of the shared group via the withdrawn file security system.

Following or concurrent with the removal 604 of the withdrawing file security system from the shared group, new cryptographic keys for the shared group are acquired 606. The remaining participant file security systems are informed and provided 608 with the new cryptographic keys. In other words, the cryptographic keys used by the file security systems affiliated with the shared group are changed (e.g., rotated), such that, going forward, new cryptographic keys are utilized to secure and subsequently access content of electronic files affiliated with the shared group.

Here, since a file security system is being removed/withdrawn from the shared group, the security or cryptographic keys utilized to encrypt and decrypt electronic files for use by the shared group are altered (e.g., rotated) such that all remaining participant file security systems receive the new keys. Hence, the withdrawn file security system does not receive the new cryptographic keys, and thus is prevented from thereafter encrypting or decrypting any additional electronic files with respect to the shared group. Finally, an acknowledgement of withdrawal from the shared group can be sent 610 to the withdrawing file security system. Following the operation 610, the withdrawal processing 600 is complete and ends.

Figure 7:
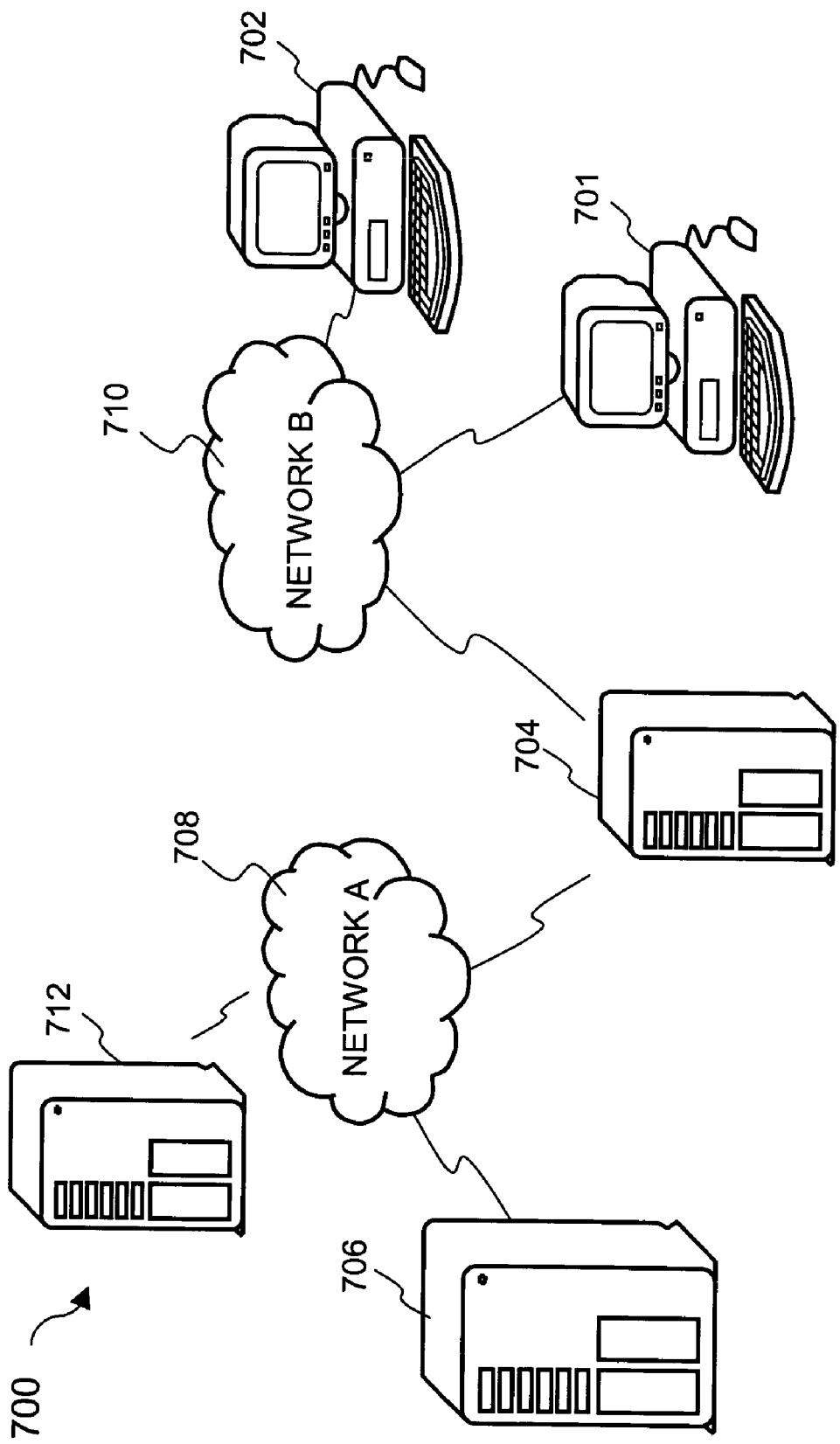
FIG. 7 shows a basic security system in which the invention may be practiced in accordance with one embodiment thereof.

FIG. 7 shows a basic security system 700 in which the invention may be practiced in accordance with one embodiment thereof. The security system 700 may be employed in an enterprise or inter-enterprise environment. It includes a first server 706 (also referred to as a central server) providing centralized access management for the enterprise. The first server 706 can control restrictive access to files secured by the security system 700. To provide dependability, reliability and scalability of the system, one or more second servers 704 (also referred to as local servers, of which one is shown) may be employed to provide backup or distributed access management for users or client machines serviced locally. For illustration purposes, there are two client machines 701 and 702 being serviced by a local server 704. Alternatively, one of the client machines 701 and 702 may be considered as a networked storage device.

Secured files may be stored in any one of the devices 701, 702, 704, 706 and 712. When a user of the client machine 701 attempts to exchange a secured file with a remote destination 712 being used by an external user, one or more of the processing 300, 400, 500 and 600 discussed above are activated to ensure that the requested secure file is delivered without compromising the security imposed on the secured file.

FIG. 8 shows an exemplary data structure 820 of a secured file that may be used in one embodiment of the invention. The data structure 820 includes two portions: a header (or header portion) 822 and encrypted data (or an encrypted data portion) 824. The header 822 can be generated in accordance with a security template associated with a data store and thus provides restrictive access to the data portion 824 which is an encrypted version of a plain file. Optionally, the data structure 820 may also include an error-checking portion 825 that stores one or more error-checking codes, for example, a separate error-checking code for each block of encrypted data 824. These error-checking codes may also be associated with a Cyclical Redundancy Check (CRC) for the header 822 and/or the encrypted data 824. The header 822 includes a flag bit or signature 827 and security information 826 that is in accordance with the security template for the store. According to one embodiment, the security information 826 is encrypted and can be decrypted with a user key associated with an authenticated user (or requestor).

The security information 826 can vary depending upon implementation. However, as shown in FIG. 8, the security information 826 includes a user identifier (ID) 828, access policy (access rules) 829, a file key 830 and other information 831. Although multiple user identifiers may be used, a user identifier 828 is used to identify a user or a group that is permitted to access the secured file. The access rules 829 provide restrictive access to the encrypted data portion 824. The file key 830 is a cipher key that, once obtained, can be used to decrypt the encrypted data portion 824 and thus, in general, is protected. In one implementation of the data structure 820, the file key 830 is encrypted in conjunction with the access rules 829. In another implementation of the data structure 820, the file key 830 is double encrypted with a protection key and further protected by the access rules 829. The other information 831 is an additional space for other information to be stored within the security information 826. For example, the other information 831 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that file security systems are able to protect secured files (e.g., documents) that are able to be shared by members of different file security systems. Another advantage of the invention is that a file security system can permit groups of users across different file security systems to access certain secured files (e.g., secured documents) associated with the group. In one embodiment, access to the secured files by any user of the group is transparent to the user. Still another advantage of the invention is that a group of users across different file security systems can be administrated from one of the file security systems.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A computer-implemented method for interacting between file security systems, the method comprising:
   creating, using a computing device, a first shared group at a first file security system;
   creating, using the computing device, a second shared group at a second file security system;
   permitting one or more users of the first file security system to be within the second shared group;
   permitting one or more users of the second file security system to be within the first shared group;
   creating, using the computing device, a third shared group; and
   permitting one or more users who are within both the first and second shared groups to be within the third shared group.

2. The computer-implemented method as recited in claim 1, wherein one or more users of the first file security system are added to or removed from the third shared group.

3. The computer-implemented method as recited in claim 2, wherein one or more users of the second file security system are added to or removed from the third shared group.

4. The computer-implemented method as recited in claim 1, wherein creating the second shared group comprises receiving at least one cryptographic key associated with the second shared group.

5. The computer-implemented method as recited in claim 1, wherein permitting one or more users who are within both the first and second shared groups to be within the third shared group comprises:
   sending an invitation to the second file security system inviting users of the second file security system to join the third shared group; and
   receiving an acceptance to the invitation from the second file security system when if the second file security system desires to join the third shared group.

6. The computer-implemented method as recited in claim 5, wherein permitting one or more users who are within both the first and second shared groups to be within the third shared group further comprises providing at least one cryptographic key associated with the third shared group to the second file security system after the receiving receives the acceptance to the invitation.

7. The computer-implemented method as recited in claim 6, wherein the at least one cryptographic key associated with the third shared group comprises at least one public-private key pair.

8. The computer-implemented method as recited in claim 1, wherein the method further comprises:
   subsequently removing users of the second file security system from the third shared group.

9. The computer-implemented method as recited in claim 8, wherein permitting one or more users who are within both the first and second shared groups to be within the third shared group supplies at least one cryptographic key associated with the third shared group to the second file security system, and wherein the method further comprises:
   supplying at least one cryptographic key to the other file security systems within the third shared group after or during the removing.

10. The computer-implemented method as recited in claim 1, wherein permitting one or more users who are within both the first and second shared groups to be within the third shared group supplies, to the second file security system, at least one historical cryptographic key associated with the third shared group and at least one current cryptographic key associated with the third shared group.

11. A computer readable storage medium including at least computer program code for interacting between file security systems, the computer readable medium comprising:
   computer program code enabling a processor to create a first shared group at a first file security system;
   computer program code enabling a processor to create a second shared group at a second file security system;
   computer program code enabling a processor to permit one or more users of the first file security system to be within the second shared group;
   computer program code enabling a processor to permit one or more users of the second file security system to be within the first shared group;
   computer program code enabling a processor to create a third shared group; and
   computer program code enabling a processor to permit one or more users who are within both the first and second shared groups to be within the third shared group.

12. A method for restricting access to electronic files, the method comprising:

receiving, at a computing device, respective requests from a first requestor being a member of a first group and a second requestor being a member of a second group requesting access to a security system, one of the first and second requestor being associated with the security system, the security system being accessible by a shared group including at least one member from each of the first group and the second group;

verifying, using the computing device, authentication information from the first and second requestor to determine if they are part of the shared group; and allowing respective ones of the first and second requestors access to the security system upon successful verification they are part of the shared group.

13. The method as recited in claim 12, wherein the requestors within the shared group are able to access key-pairs needed to decrypt and/or encrypt an electronic file for restricted access by only those requestors within the shared group, and wherein the electronic file contains encrypted file data and encrypted security information, the encrypted security information is decrypted with a key from the key-pairs corresponding to the shared group.

14. The method as recited in claim 13, wherein the security information includes at least a key to decrypt the encrypted file data.

15. A computer-readable storage medium comprising computer program code enabling a computing device to perform a method for restricting access to electronic files, the method comprising:

receiving respective requests from a first requestor being a member of a first group and a second requestor being a member of a second group requesting access to a security system, one of the first and second requestor being associated with the security system, the security system being accessible by a shared group including at least one member from each of the first group and the second group;

verifying authentication information from the first and second requestor to determine if they are part of the shared group; and allowing respective ones of the first and second requestors access to the security system upon successful verification they are part of the shared group.

16. A system that restricts access to electronic files, comprising:

a computing device comprising:

a processor; and a memory;

wherein the computing device is capable of receiving respective requests from a first requestor being a member of a first group and a second requestor being a member of a second group requesting access to the security system, one of the first and second requestor being associated with the security system, the security system being accessible by a shared group including at least one member from each of the first group and the second group; and wherein the computing device is capable of verifying authentication information from the first and second requestor to determine if they are part of the shared group, wherein respective ones of the first and second requestors are allowed access to the security system upon successful verification they are part of the shared group.

17. The system as recited in claim 16, wherein the requestors within the shared group are able to access key-pairs needed to decrypt and/or encrypt electronic files for restricted access by only those requestors within the shared group.

18. The system as recited in claim 17, wherein following an event, the key-pairs associated with the shared group are changed.

19. The system as recited in claim 18, wherein the event is an entity withdrawal from the shared group.

\* \* \* \* \*

UNITED STATES PATENT AND TRADEMARK OFFICE
CERTIFICATE OF CORRECTION

| | | |
|---|---|---|
| PATENT NO. | : 7,730,543 B1 | Page 1 of 1 |
| APPLICATION NO. | : 10/610832 | |
| DATED | : June 1, 2010 | |
| INVENTOR(S) | : Satyajit Nath | |

It is certified that error appears in the above-identified patent and that said Letters Patent is hereby corrected as shown below:

Claim 5: Column 12, line 16: Replace "system when if the" with -- system if the --

Claim 16: Column 14, line 16: Replace "access to the security system" with -- access to a security system --

Signed and Sealed this
Eighth Day of May, 2012

David J. Kappos
*Director of the United States Patent and Trademark Office*